United States Patent
Meiri et al.

(10) Patent No.: US 10,956,078 B2
(45) Date of Patent: Mar. 23, 2021

(54) STORAGE SYSTEM WITH LOOPBACK REPLICATION PROCESS PROVIDING OBJECT-DEPENDENT SLICE ASSIGNMENT

(71) Applicant: EMC IP Holding Company LLC, Hopkinton, MA (US)

(72) Inventors: David Meiri, Somerville, MA (US); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

(21) Appl. No.: 15/937,192

(22) Filed: Mar. 27, 2018

(65) Prior Publication Data

US 2019/0303009 A1    Oct. 3, 2019

(51) Int. Cl.
    *G06F 3/06*    (2006.01)
(52) U.S. Cl.
    CPC ............ *G06F 3/065* (2013.01); *G06F 3/0604* (2013.01); *G06F 3/067* (2013.01)
(58) Field of Classification Search
    CPC ......... G06F 3/065; G06F 3/0604; G06F 3/067
    See application file for complete search history.

(56) References Cited

U.S. PATENT DOCUMENTS

| 4,860,191 A * | 8/1989 | Nomura ............... G06F 9/3879 710/110 |
| 5,060,188 A * | 10/1991 | Zulian ............... G06F 12/0215 711/204 |
| 5,403,639 A * | 4/1995 | Belsan ................. G06F 16/10 |
| 7,165,155 B1 | 1/2007 | Duprey et al. |
| 7,440,982 B2 | 10/2008 | Lu et al. |
| 7,444,464 B2 | 10/2008 | Urmston et al. |

(Continued)

FOREIGN PATENT DOCUMENTS

| WO | 2016111954 A1 | 7/2016 |
| WO | PCT/US2019/024885 | 1/2020 |
| WO | PCT/US2019/024900 | 1/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Andrew J Cheong
(74) *Attorney, Agent, or Firm* — Ryan, Mason & Lewis, LLP

(57) ABSTRACT

A storage system in one embodiment comprises a plurality of storage devices and a storage controller. The storage system is configured to implement a loopback replication process in which one or more source storage objects are replicated to one or more corresponding target storage objects within the storage system. The storage system is further configured to divide a storage space provided by at least portions of the storage devices of the storage system into slices, to subdivide the slices into source slices and target slices, and to replicate a source storage object associated with at least one of the source slices to a target storage object associated with at least one of the target slices. The source storage object may be associated with at least one of the source slices by, for example, storing the source storage object across portions of the storage devices in designated ones of the source slices.

20 Claims, 6 Drawing Sheets

(56) References Cited

U.S. PATENT DOCUMENTS

| | | |
|---|---|---|
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,110,964 B1 | 8/2015 | Shilane et al. |
| 9,208,162 B1 | 12/2015 | Hallak et al. |
| 9,286,003 B1 | 3/2016 | Hallak et al. |
| 9,459,809 B1* | 10/2016 | Chen ................ G06F 3/0644 |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 9,830,333 B1 | 11/2017 | Wisniewski et al. |
| 9,891,994 B1 | 2/2018 | Schneider et al. |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Stronge et al. |
| 10,394,485 B1 | 8/2019 | Chen et al. |
| 10,437,501 B1 | 10/2019 | Kucherov et al. |
| 10,437,855 B1 | 10/2019 | Stronge et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Stronge |
| 10,754,736 B2 | 8/2020 | Shani et al. |
| 10,761,933 B2 | 9/2020 | Moore et al. |
| 2004/0225697 A1 | 11/2004 | Asano et al. |
| 2006/0047713 A1 | 3/2006 | Gornshtein et al. |
| 2006/0168154 A1* | 7/2006 | Zhang ................ G06F 11/1662 709/220 |
| 2007/0022121 A1 | 1/2007 | Bahar et al. |
| 2008/0279462 A1 | 11/2008 | Celi, Jr. |
| 2009/0030983 A1* | 1/2009 | Malaiyandi ......... G06F 11/1076 709/204 |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2011/0022566 A1 | 1/2011 | Beaverson et al. |
| 2011/0138144 A1 | 6/2011 | Tamura et al. |
| 2011/0225123 A1 | 9/2011 | D'Souza et al. |
| 2012/0124282 A1 | 5/2012 | Frank et al. |
| 2012/0179653 A1 | 7/2012 | Araki et al. |
| 2012/0294154 A1 | 11/2012 | Missett et al. |
| 2013/0305002 A1 | 11/2013 | Hallak et al. |
| 2013/0325824 A1 | 12/2013 | Shoens |
| 2014/0006354 A1* | 1/2014 | Parkison .............. G06F 3/0611 707/649 |
| 2014/0181016 A1 | 6/2014 | Whitehead et al. |
| 2014/0233366 A1 | 8/2014 | Prahlad et al. |
| 2014/0244935 A1 | 8/2014 | Ezra et al. |
| 2014/0310441 A1* | 10/2014 | Klughart ............. G06F 3/0608 710/301 |
| 2015/0092539 A1 | 4/2015 | Sivabalan et al. |
| 2015/0220280 A1* | 8/2015 | Ishizaki ............... G06F 3/0619 711/114 |
| 2015/0293817 A1 | 10/2015 | Subramanian et al. |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0283328 A1* | 9/2016 | Akirav ................ G06F 11/1451 |
| 2016/0345207 A1 | 11/2016 | Kwak et al. |
| 2017/0017433 A1 | 1/2017 | Ishikawa et al. |
| 2017/0075842 A1 | 3/2017 | Su et al. |
| 2017/0090806 A1* | 3/2017 | Xiong ................... G06F 3/0629 |
| 2017/0147213 A1* | 5/2017 | Amidi .................. G06F 3/061 |
| 2017/0185529 A1 | 6/2017 | Chhabra et al. |
| 2017/0192857 A1 | 7/2017 | Meiri et al. |
| 2018/0070283 A1 | 3/2018 | Zhang |
| 2018/0095873 A1 | 4/2018 | Nakagoe et al. |
| 2019/0095112 A1 | 3/2019 | Lingarajappa |
| 2019/0149449 A1 | 5/2019 | Morris |
| 2019/0303490 A1 | 10/2019 | Chen et al. |
| 2019/0303491 A1 | 10/2019 | Chen et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

Itzikr, "DellEMC XtremIO X2/X1 Management, Part 1, the CAS Architecture = Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

Itzikr, "DellEMC XtremIO X2 Tech Preview #2—Native Replication," https://xtremio.me/2017/05/09/dellemc-xtremio-x2-tech-preview-2-native-replication/, May 9, 2017, 8 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

(56) References Cited

OTHER PUBLICATIONS

Dell EMC, "Introduction to Dell EMC XtremIO X2 Storage Array—a Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
U.S. Appl. No. 15/662,708 filed in the name of Xianping Chen et al. on Jul. 28, 2017 and entitled "Token-Based Data Flow Control in a Clustered Storage System."
U.S. Appl. No. 15/662,809 filed in the name of William Stronge et al. on Jul. 28, 2017 and entitled "Automatic Verification of Asynchronously Replicated Data."
U.S. Appl. No. 15/662,833 filed in the name of William Stronge et al. on Jul. 28, 2017 and entitled "Signature Generator for Use in Comparing Sets of Data in a Content Addressable Storage System."
U.S. Appl. No. 15/793,121 filed in the name of David Meiri et al. on Oct. 25, 2017 and entitled "Opportunistic Compression of Replicated Data in a Content Addressable Storage System."
U.S. Appl. No. 15/793,147 filed in the name of Ernesto Blanco et al. on Oct. 25, 2017 and entitled "Compression Signaling for Replication Process in a Content Addressable Storage System."
U.S. Appl. No. 15/872,553 filed in the name of Svetlana Kronrod et al. on Jan. 16, 2018 and entitled "Storage System with Consistent Termination of Data Replication Across Multiple Distributed Processing Modules."
U.S. Appl. No. 15/824,536 filed in the name of Christopher Sayles et al. on Nov. 28, 2017 and entitled "Storage System with Asynchronous Messaging Between Processing Modules for Data Replication."
U.S. Appl. No. 15/819,666 filed in the name of Xiangping Chen et al. on Nov. 21, 2017 and entitled "Storage System Configured for Controlled Transition Between Asynchronous and Synchronous Replication Modes."
U.S. Appl. No. 15/876,433 filed in the name of Xiangping Chen et al. on Jan. 22, 2018 and entitled "Storage System with Consistent Initiation of Data Replication Across Multiple Distributed Processing Modules."
Dell EMC, "Introduction to Dell EMC XtremIO X2 Storage Array—a Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack Flex," Dell EMC Product Overview, 2018, 5 pages.
U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."
U.S. Appl. No. 16/396,897 filed in the name of Anton Kucherov et al. on Apr. 29, 2019, and entitled "Storage System with Deduplication-Aware Replication Implemented Using a Standard Storage Command Protocol."
U.S. Appl. No. 16/413,050 filed in the name of Xiangping Chen et al. on May 15, 2019, and entitled "Storage System with Coordinated Recovery across Multiple Input-Output Journals of Different Types."
U.S. Appl. No. 16/530,121 filed in the name of Anton Kucherov et al. on Aug. 2, 2019, and entitled "Memory-Efficient Processing of Raid Metadata Bitmaps."
U.S. Appl. No. 16/663,524 filed in the name of Xiangping Chen et al. on Oct. 25 2019, and entitled "Storage System with Throughput-Based Timing of Synchronous Replication Recovery."
U.S. Appl. No. 16/665,651 filed in the name of Lior Kamran et al. on Oct. 28 2019, and entitled "Recovery Flow with Reduced Address Lock Contention in a Content Addressable Storage System."
U.S. Appl. No. 16/671,824 filed in the name of Lior Kamran et al. on Nov. 1, 2019, and entitled "Storage System Capacity Expansion Using Mixed-Capacity Storage Devices."
U.S. Appl. No. 16/693,858 filed in the name of Doron Tal on Nov. 25, 2019, and entitled "Storage System with Prioritized RAID Rebuild."

\* cited by examiner

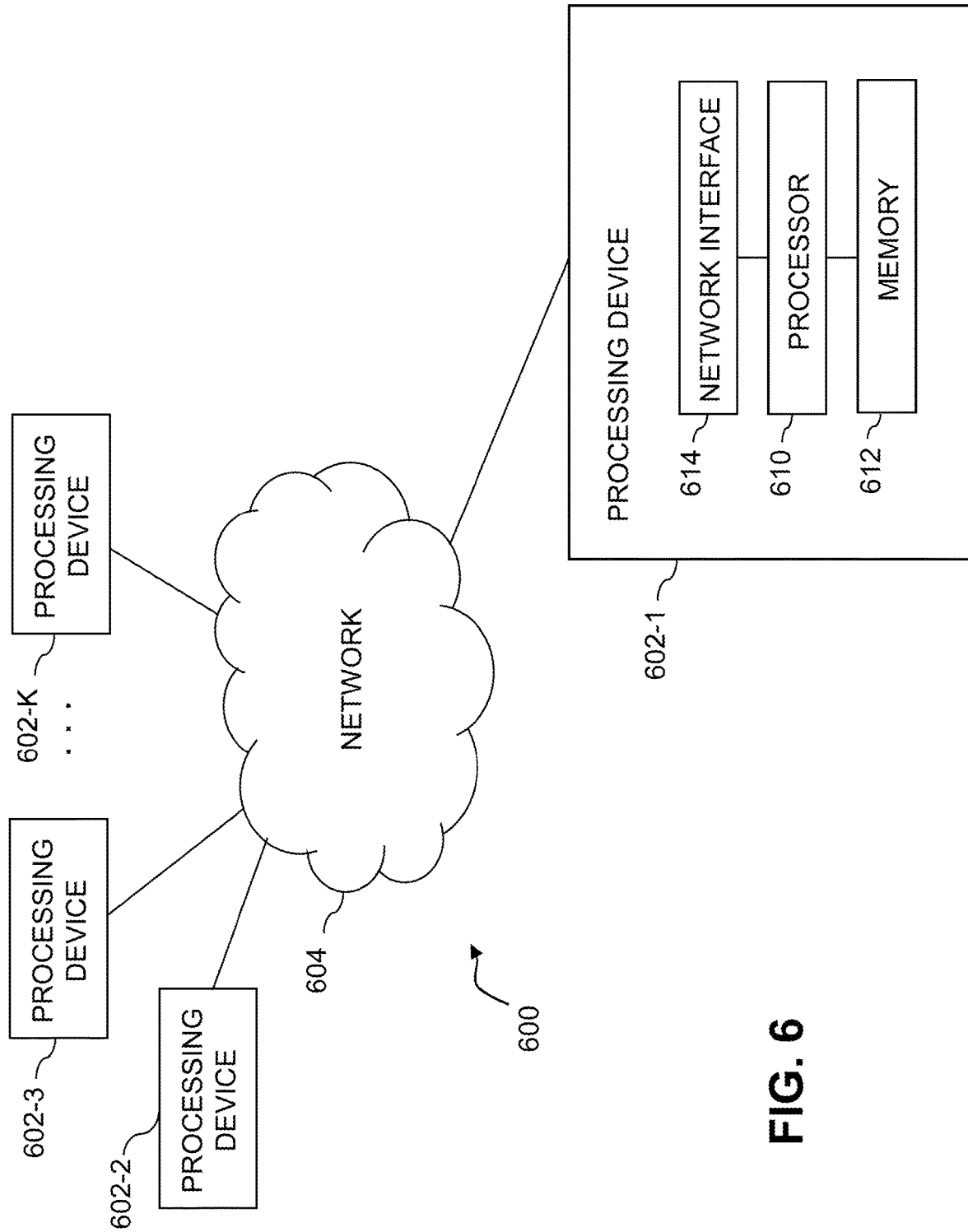

STORAGE SYSTEM WITH LOOPBACK REPLICATION PROCESS PROVIDING OBJECT-DEPENDENT SLICE ASSIGNMENT

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Source site and target site storage systems can therefore each be configured to support both asynchronous and synchronous replication modes.

Conventional approaches to data replication can be problematic under certain conditions. For example, when testing the replication functionality of a given storage system, it may be necessary to provide an additional storage system to act as a source storage system or a target storage system relative to the storage system under test. This unduly increases the complexity and expense associated with replication testing.

SUMMARY

Illustrative embodiments include techniques for loopback replication providing object-dependent slice assignment for source and target storage objects in an information processing system. These embodiments allow the replication functionality of a given storage system to be accurately and efficiently tested in a loopback configuration and therefore without the need for any additional storage system to act as a source storage system or a target storage system relative to the storage system under test.

Such embodiments can advantageously eliminate those situations in which source and target storage object identifier collisions might otherwise arise when implementing loopback replication using replication techniques that are based on replication between separate and distinct source and target storage systems. The complexity and expense associated with replication testing can therefore be considerably reduced. Moreover, these and other advantages are provided in illustrative embodiments without undermining the efficiency of non-loopback replication functionality of the storage system.

These embodiments illustratively include a clustered implementation of a content addressable storage system having a distributed storage controller. Similar advantages can be provided in other types of storage systems.

In one embodiment, an apparatus comprises a storage system that includes a plurality of storage devices and a storage controller. The storage system is configured to implement a loopback replication process in which one or more source storage objects are replicated to one or more corresponding target storage objects within the storage system. The storage system is further configured to divide a storage space provided by at least portions of the storage devices of the storage system into slices, to subdivide the slices into source slices and target slices, and to replicate a source storage object associated with at least one of the source slices to a target storage object associated with at least one of the target slices.

The storage system further comprises at least one loopback communication link over which source data of the source storage object and other replication-related information is both transmitted and received by the storage system.

The source storage object may be associated with at least one of the source slices by storing the source storage object across portions of the storage devices in designated ones of the source slices. Similarly, the target storage object may be associated with at least one of the target slices by storing the target storage object across portions of the storage devices in designated ones of the target slices.

The source and target storage objects may comprise, for example, respective source and target logical volumes of the storage system, or other arrangements of source data to be replicated to target data.

The logical block addresses of the source and target storage objects of the storage system are illustratively configured to include at least one designated bit indicating for each such logical block address whether that address is in one of the source slices or in one of the target slices. For example, a single most significant bit of a given logical block address may be set to a value of logic zero to indicate that the given logical block address is in one of the source slices and set to a value of logic one to indicate that the given logical block address is in one of the target slices. Numerous other logical block address formats can be used to distinguish between source and target slices in other embodiments.

In some embodiments, the storage space subject to division into slices has a total storage capacity of $X*Y$ and is divided into X slices each having storage capacity Y, with the X slices each having storage capacity Y being further subdivided into X source slices and X target slices such that the storage space effectively includes a total of 2X source and target slices each having storage capacity $Y/2$. A wide variety of alternative techniques for dividing a storage space into slices and subdividing the slices into source slices and target slices can be used in other embodiments.

The storage system illustratively comprises a content addressable storage system having one or more sets of non-volatile memory storage devices. For example, the storage devices of the storage system in such embodiments can comprise flash memory storage devices configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 5 and 6 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
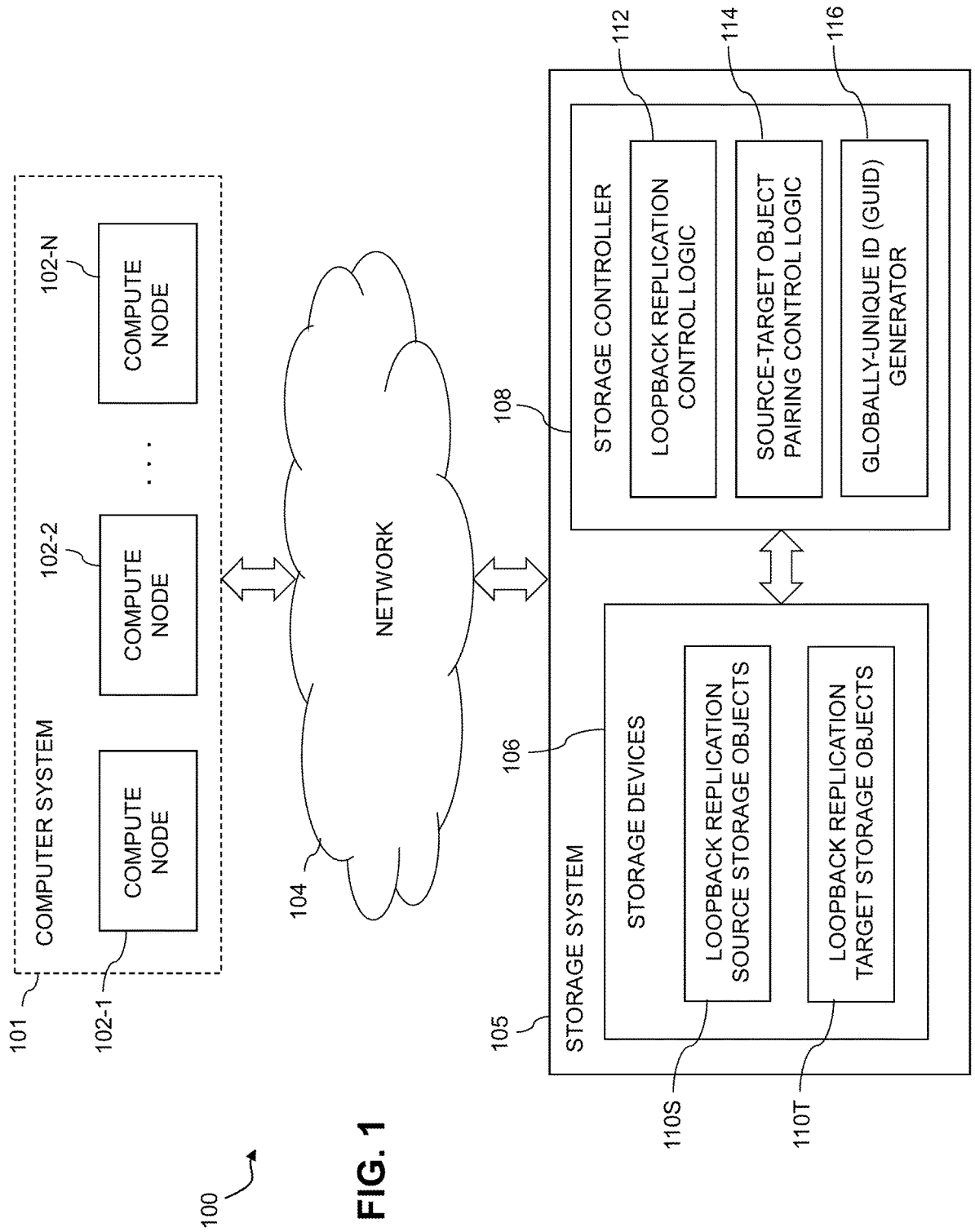
FIG. 1 is a block diagram of an information processing system comprising a storage system configured to implement a loopback replication process providing object-dependent slice assignment for source and target storage objects in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the storage system 105. The compute nodes 102 and the storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the compute nodes 102 of the computer system 101 over the network 104. The storage system 105 comprises a plurality of storage devices 106 and an associated storage controller 108.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage system 105 is configured to implement a loopback replication process in which one or more source storage objects are replicated to one or more corresponding target storage objects within the storage system. The loopback replication process can comprise one or more asynchronous or synchronous replication modes. For example, the loopback replication process can include a cycle-based asynchronous replication mode in which differential data derived from snapshots of the source storage object is utilized to update the target storage object in each of a plurality of replication cycles.

Further details regarding asynchronous replication processes suitable for use in illustrative embodiments herein can be found in U.S. patent application Ser. No. 15/662,809, filed Jul. 28, 2017 and entitled "Automatic Verification of Asynchronously Replicated Data," which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of data replication.

As another example, the loopback replication process can include a synchronous replication mode in which host write operations directed to the source storage object are mirrored to the target storage object. A wide variety of other types of replication modes or processes can be used in other embodiments.

A given "replication process" as that term is broadly used herein may therefore include both asynchronous and synchronous replication modes as well as support for concurrent operation of such modes and separate operation of the individual modes. The term "mode" as used herein in conjunction with asynchronous or synchronous replication may therefore itself comprise a corresponding asynchronous or synchronous replication process.

In addition, a replication process in some embodiments can comprise a process for migrating data from one location to another within the storage system 105. For example, a source storage object can be replicated to a target storage object in conjunction with migration of the corresponding data from one storage pool to another storage pool, from one RAID group to another RAID group, or otherwise from one location to another location within the storage system 105. A replication process as that term is broadly used herein is therefore intended to encompass such arrangements in which, for example, a source storage object is deleted from the storage system 105 after its successful migration to a target storage object.

Figure 4:
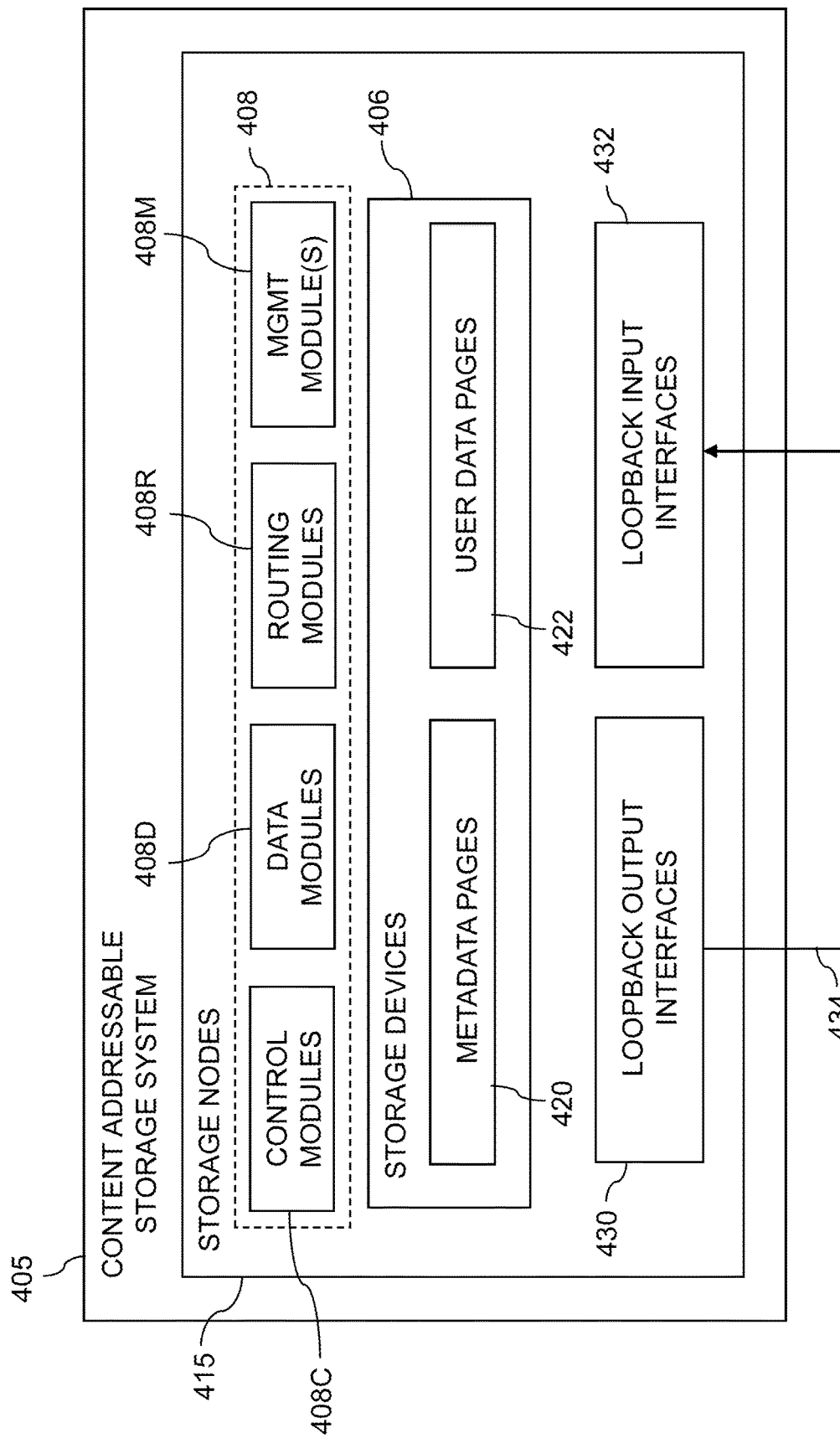
FIG. 4 shows an example of a content addressable storage system having a distributed storage controller for implementing loopback replication functionality in an illustrative embodiment.

The storage system 105 is assumed to comprise at least one loopback communication link over which source data of the one or more source storage objects and other replication-related information is both transmitted and received by the storage system 105, although such loopback communication links are not expressly shown in FIG. 1. The loopback communication links can comprise IP links or other types of network connections, as well as combinations of various links of different network connection types, that are utilized by the storage system 105 in conjunction with loopback replication. One possible example of a set of loopback communication links is shown in FIG. 4.

The storage devices 106 of storage system 105 comprise loopback replication source storage objects 110S and loopback replication target storage objects 110T. The source and target storage objects 110S and 110T may comprise, for example, respective source and target logical volumes of the storage system 105, or any other type of source and target data items that may be subject to loopback replication.

The storage controller 108 of the storage system 105 comprises loopback replication control logic 112, source-target object pairing control logic 114, and a globally-unique identifier (GUID) generator 116.

The loopback replication control logic 112 directs the overall loopback replication process implemented within the storage system 105, and interacts with the source-target object pairing control logic 114 and the GUID generator 116 in directing the storage system 105 to perform loopback replication process operations such as those to be described below in conjunction with the flow diagram of FIG. 2.

The GUID generator 116 in some embodiments randomly generates globally-unique identifiers or GUIDs that are utilized as pairing identifiers by the source-target object pairing control logic 114 to pair source storage objects with respective target storage objects for loopback replication purposes. The GUIDs are therefore examples of what are more generally referred to herein as "pairing identifiers."

In operation, the storage system 105 under the direction of the loopback replication control logic 112 of the storage controller 108 is configured to obtain a pairing identifier from the GUID generator 116, and to pair a source storage object with a target storage object by associating the pairing identifier with the source storage object and the target storage object utilizing the source-target object pairing control logic 114. The storage system 105 is then able to replicate the source storage object to the target storage object based at least in part on the pairing identifier. The storage system 105 is more particularly configured to divide a storage space provided by at least portions of the storage devices 106 into slices, to subdivide the slices into source slices and target slices, and to replicate a source storage object associated with at least one of the source slices to a target storage object associated with at least one of the target slices.

The GUID is globally unique within the storage system 105. Thus, the term "global" in this embodiment refers to the entire storage space of the storage system 105. The GUID is illustratively implemented as a 16-byte randomly-generated identifier that serves as a pairing identifier. Pairing of the source and target storage objects via a pairing identifier ensures that a replication engine or other implementation of the loopback replication control logic 112 of the storage controller 108 can easily determine the appropriate locations from which to read source data of the source storage object and at which to write the source data to the target storage object, thereby facilitating the replication process. However, use of the same pairing identifier for source and target storage objects in loopback replication absent object-dependent slice assignment for source and target storage objects as disclosed herein could otherwise lead to collisions between the source and target objects.

Illustrative embodiments avoid such collisions by associating the source storage object with at least one of the source slices and associating the target storage object with at least one of the target slices, as indicated above.

Logical block addresses or LBAs of the source and target storage objects of the storage system 105 are configured to include at least one designated bit indicating for each such logical block address whether that address is in one of the source slices or in one of the target slices. Examples of such logical block address formats in which a most significant bit of the logical block address is used to indicate if the logical block address is in a source slice or in a target slice will be described below.

The source storage object is associated with at least one of the source slices by storing the source storage object across portions of the storage devices 106 in designated ones of the source slices.

Similarly, the target storage object is associated with at least one of the target slices by storing the target storage object across portions of the storage devices 106 in designated ones of the target slices.

In some embodiments, a given storage space provided by at least portions of the storage devices 106 is divided into slices based at least in part on a specified range of bits within the logical block addresses of a logical volume of the storage system. The logical block addresses may more particularly comprise respective logical page addresses, such that each logical block comprises a logical page of user data.

For example, a storage space having a total storage capacity of X*Y may be divided into X slices each having storage capacity Y. Each of the X slices having storage capacity Y is then further subdivided into X source slices and X target slices, such that the storage space effectively includes a total of 2X source and target slices each having storage capacity Y/2. Numerous other arrangements are possible for dividing a storage space into slices and further subdividing the slices into source slices and target slices.

As a more particular example, assume that the storage system 105 is configured to store logical blocks of user data in the form of 16 kilobyte (KB) pages. The initial division of a storage space into slices can utilize a 10-bit portion of the logical page address to divide the storage space into 1024 slices. The 10-bit portion of the logical page address illustratively comprises bits 8 through 17 of the logical page address, which is also referred to as a logical x-page address or LXA address. Since each page in this example is 16 KB, in traversing the address space of a logical volume, every 256*16 KB=4 MB will begin a new slice, and after 1024*4 MB=4 GB the traversal returns to the original first slice. These 1024 slices are further subdivided into source slices and target slices through the use of the most significant bit of the logical page address, with a logic zero value in the most significant bit indicating a source slice and a logic one in the most significant bit indicating a target slice. Thus, there are effectively 2048 slices instead of 1024 slices in this example, with half of the 2048 slices being source slices and the other half of the 2048 slices being target slices.

During loopback replication, input-output (IO) operations processed for a source logical volume or other source storage object in the storage system 105 utilize the source slices, while IO operations processed for a target logical volume or other target storage object in the storage system 105 utilize the target slices. Snapshot sets in an asynchronous replication mode of the loopback replication are generated separately for the source storage object utilizing the source slices and the target storage object utilizing the target slices.

Although the object-based slice assignment in this example is implemented using the most significant bit of the logical page address, one or more other fixed bits outside of the offset range of the logical storage volume can similarly be used for this purpose.

Additional examples of source and target storage object logical block address formats will be presented below in the description of FIG. 3.

In conjunction with replication of the source storage object to the target storage object, the storage system 105 is further configured to receive the pairing identifier with inbound loopback replication data of the source storage object, and to utilize the received pairing identifier to identify the target storage object to which the inbound loopback replication data is to be replicated.

Such operations can be repeated in multiple iterations for respective different portions of the source data of the source storage object, until all source data of the source storage object has been replicated to the target storage object.

These and other operations carried out as part of the loopback replication process of storage system 105 are illustratively performed under the control of the loopback replication control logic 112 of the storage controller 108.

Although illustratively shown as being implemented within the storage system 105, the storage controller 108 in other embodiments can be implemented at least in part within the computer system 101, in another system component, or as a stand-alone component coupled to the network 104.

The computer system 101 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the storage system 105 may be implemented on respective distinct processing platforms, although numerous other arrangements are possible. For example, in some embodiments at least portions of the computer system 101 and the storage system 105 are implemented on the same processing platform. The storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different ones of the compute nodes 102 to reside in different data centers than the storage system 105. Numerous other distributed implementations of one or both of the computer system 101 and the storage system 105 are possible. Accordingly, the storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, storage system 105, storage devices 106 and storage controller 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 214, and is suitable for use in the system 100 but is more generally applicable to other types of information processing systems in which a storage system is configured to perform loopback replication. The steps are illustratively performed at least in part under the control of a loopback replication engine or other arrangement of loopback replication control logic in a storage controller of the storage system.

In step 200, a loopback replication process is initiated in order to replicate a source storage object to a target storage object within the storage system. As indicated previously, the loopback replication process is assumed to comprise at least one of a cycle-based asynchronous replication mode in which differential data derived from snapshots of the source storage object is utilized to update the target storage object in each of a plurality of replication cycles, and a synchronous replication mode in which host write operations directed to the source storage object are mirrored to the target storage object.

In some embodiments, the loopback replication process may start in one of the modes and transition to the other mode, and then back again. For example, the loopback replication process may start in an asynchronous replication mode and transition to a synchronous replication mode and vice-versa. Such replication modes may alternatively be implemented as respective separate replication processes.

In step 202, a pairing identifier is obtained. The pairing identifier illustratively comprises a GUID of the type previously described.

In step 204, the source and target storage objects are paired with one another by associating the obtained pairing identifier with the source and target storage objects.

In step 206, in conjunction with the loopback replication of the storage object to the target storage object, source data of the source storage object is obtained for a set of logical addresses each identifying a source slice. The source data comprises at least a portion of the data content of the source storage object.

In step 208, the pairing identifier associated with the source storage object is utilized to identify the target storage object.

In step 210, the source data is replicated to the target storage object at a corresponding set of logical addresses each identifying a target slice.

Figure 3:
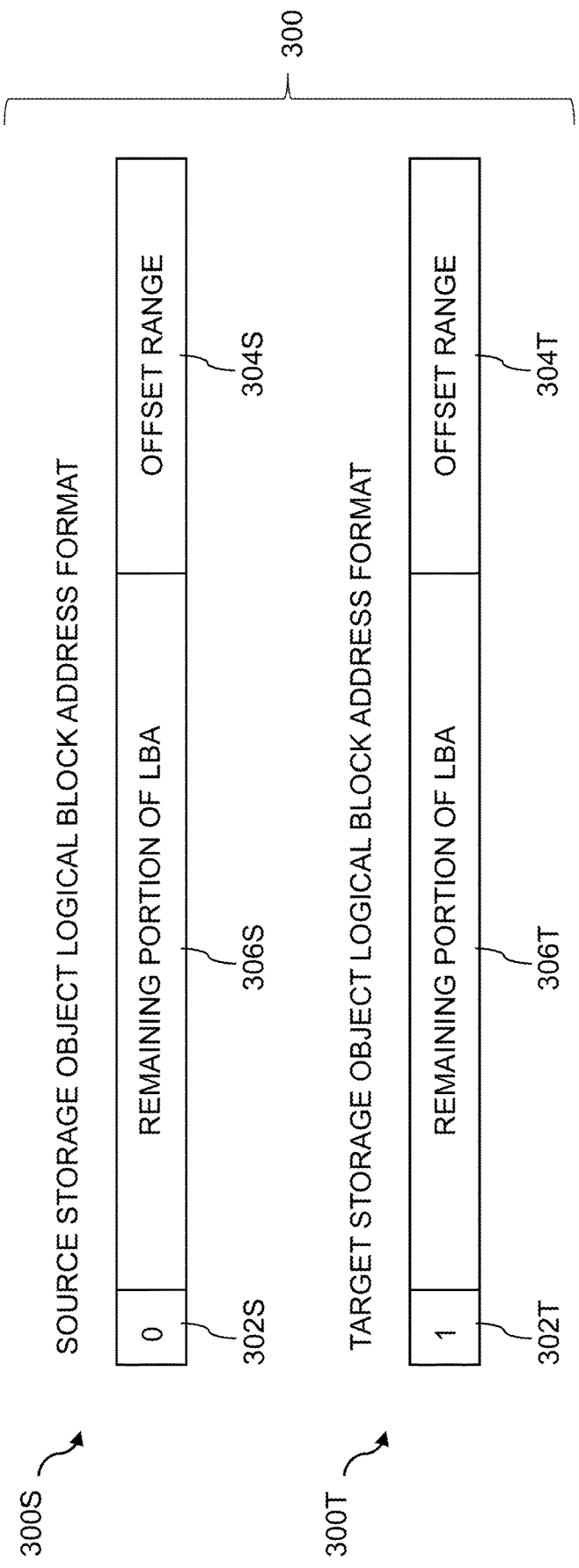
FIG. 3 shows example formats for respective source and target logical block addresses in respective source and target slices in an illustrative embodiment.

Example formats for respective source and target logical block addresses in respective source and target slices are shown in FIG. 3. These source and target logical block addresses are utilized in steps 206 and 210 to provide object-dependent slice assignment for the respective source and target storage objects.

An example of an arrangement of this type is illustrated in FIG. 3, which shows logical block address formats 300 more particularly including source storage object logical block address format 300S and target storage object logical block address format 300T. The source and target logical block address formats 300S and 300T comprise respective source-target slice assignment fields 302S and 302T, respective offset ranges 304S and 304T, and remaining portions 306S and 306T of the particular logical block address.

The source-target slice assignment fields 302S and 302T each comprise a single bit in the respective source and target formats 300S and 300T, with a logic zero value in the field 302S indicating assignment to a source slice and a logic one value in the field 302T indicating assignment to a target slice. The single-bit source-target slice assignment field comprises a final bit of the logical block address, illustratively a most significant bit of the logical block address as illustrated.

The offset ranges 304S and 304T each comprise a designated number of bits of the logical block address formats 300, illustratively comprising multiple least significant bits in this embodiment. These bits are configured to specify an offset of a user data page or other logical block within a given source or target slice.

The remaining portions 306S and 306T of the particular logical block address further identify the given source or target slice.

The particular logical block address formats and fields shown in FIG. 3 and described above are only illustrative examples, and numerous other logical block address formats using different arrangements and configurations of fields can be used. For example, a different fixed bit position or multiple fixed bit positions can be used for the source-target slice assignment field in other embodiments.

The remainder of the FIG. 2 process will now be described.

In step 212, a determination is made as to whether or not there is additional source data of the source storage object to be replicated from the source to the target. If there is additional source data of the source storage object still remaining to be replicated, the process returns to step 206 to replicate at least a portion of the additional source data using steps 206, 208 and 210, and otherwise the process ends as indicated in step 214.

One or more additional iterations through steps 206, 208, 210 and 212 may also be performed, until all of the source data of the source storage object has been replicated to the target storage object, at which point a negative determination in step 212 will cause the process to end in step 214.

Figure 2:
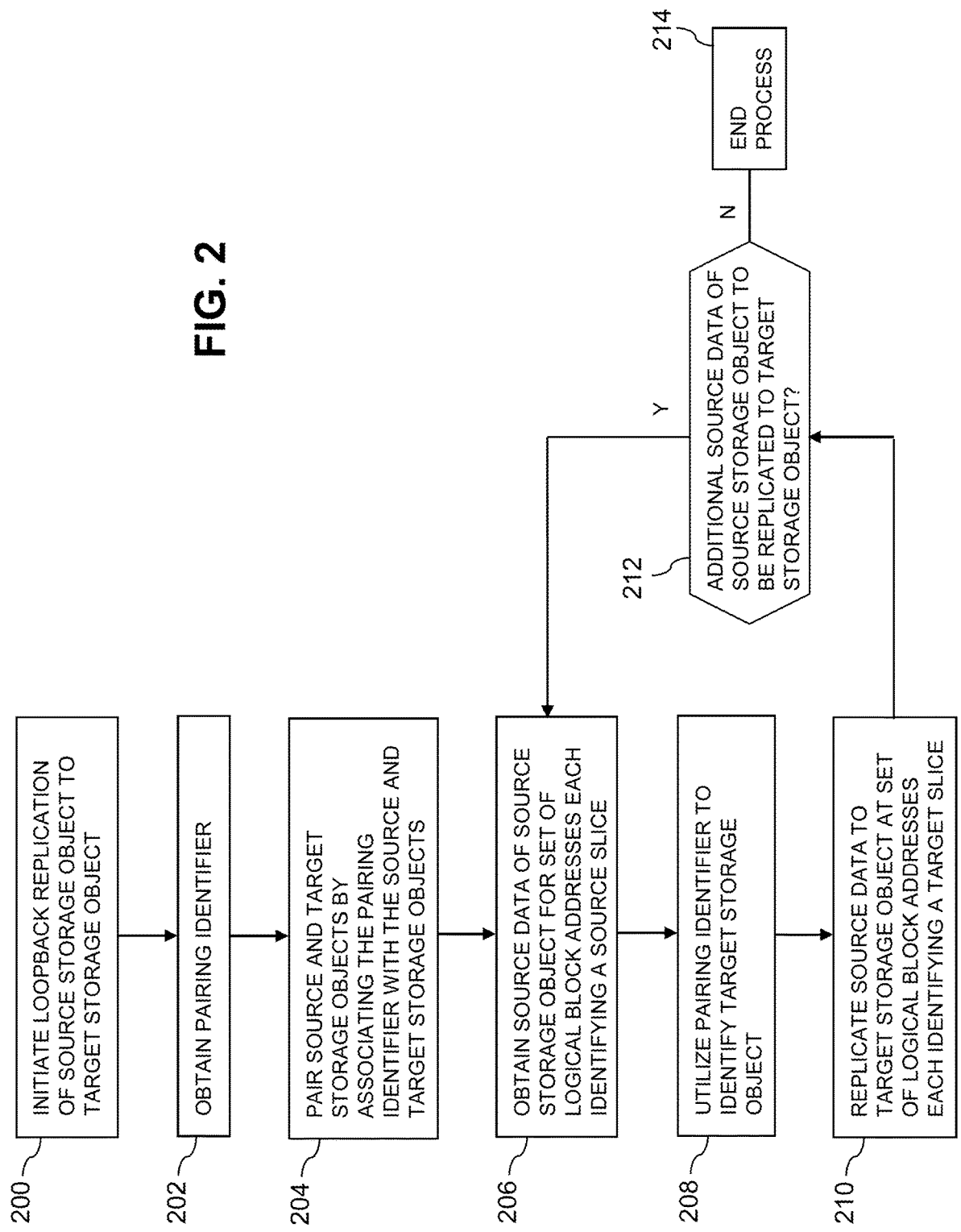
FIG. 2 is a flow diagram of a process for loopback replication providing object-dependent slice assignment for source and target storage objects in an illustrative embodiment.

In the FIG. 2 embodiment, the loopback replication process may transition from asynchronous replication to synchronous replication, and vice-versa. During at least a portion of such a transition, the storage system may concurrently operate in both asynchronous and synchronous replication modes, possibly using controlled transition functionality as disclosed in U.S. patent application Ser. No. 15/819,666, filed Nov. 21, 2017 and entitled "Storage System Configured for Controlled Transition Between Asynchronous and Synchronous Replication Modes," which is incorporated by reference herein.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing loopback replication providing object-dependent slice assignment for source and target storage objects. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different loopback replication processes for respective different sets of replicated data or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array or other type of content addressable storage system suitably modified to incorporate loopback replication techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of storage system 105, and accordingly is assumed to be coupled to computer system 101 having compute nodes 102 via network 104 within information processing system 100.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 422 can include any type of user data that may be utilized in the system 100. The term "user data" herein is therefore also intended to be broadly construed.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The distributed storage controller 408 in the present embodiment is configured to implement loopback replication functionality of the type previously described in conjunction with FIGS. 1 through 3.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP and Transmission Control Protocol (TCP). For example, respective sets of IP links used in data transfer and corresponding messaging could be associated with respective different ones of the routing modules 408R.

Ownership of a user data logical address space within the content addressable storage system 405 is illustratively distributed among the control modules 408C.

It is desirable in these and other storage system contexts to implement loopback replication functionality across multiple distributed processing modules, such as the processing modules 408C, 408D, 408R and 408M of the distributed storage controller 408.

The management module 408M of the storage controller 408 may include a loopback replication engine or other arrangement of loopback replication control logic that engages corresponding control logic instances in all of the control modules 408C and routing modules 408R in order to implement a loopback replication process.

The loopback replication process in this embodiment utilizes loopback output interfaces 430 and loopback input interfaces 432 of the storage nodes 415. The loopback output interfaces 430 and loopback input interfaces 432 are coupled together via one or more communication links 434 which carry replication-related information from replication outputs of the content addressable storage system 405 to corresponding replication inputs of the content addressable storage system 405.

The interfaces 430 and 432 may be the same interfaces that would normally be used to interface the storage system 405 with a separate target storage system in a non-loopback replication process implemented by storage system 405.

In some embodiments, the content addressable storage system 405 comprises an XtremIO™ storage array suitably modified to incorporate techniques for loopback replication as disclosed herein. In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, loopback replication functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408. These assigned slices are then further subdivided into source and target slices in the manner described elsewhere herein.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the compute nodes 102. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 105. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement loopback replication functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of content addressable storage systems or other types of storage systems with loopback replication functionality as disclosed herein can provide a number of significant advantages relative to conventional arrangements.

For example, some embodiments implement loopback replication providing object-dependent slice assignment for source and target storage objects within a given storage system.

These embodiments allow the replication functionality of a given storage system to be accurately and efficiently tested in a loopback configuration and therefore without the need for any additional storage system to act as a source storage system or a target storage system relative to the storage system under test.

Such embodiments can advantageously eliminate those situations in which source and target storage object identifier collisions might otherwise arise when implementing loopback replication using replication techniques that are based on replication between separate and distinct source and target storage systems. The complexity and expense associated with replication testing can therefore be considerably reduced.

In addition, loopback replication arrangements with object-based slice assignment advantageously allow full separation of source storage volumes and target storage volumes on a control module basis within a distributed storage controller of a content addressable storage system, thereby providing more accurate emulation of a two-system non-loopback replication configuration.

Moreover, these and other advantages are provided in illustrative embodiments without undermining the efficiency of non-loopback replication functionality of the storage system.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 105 and 405, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
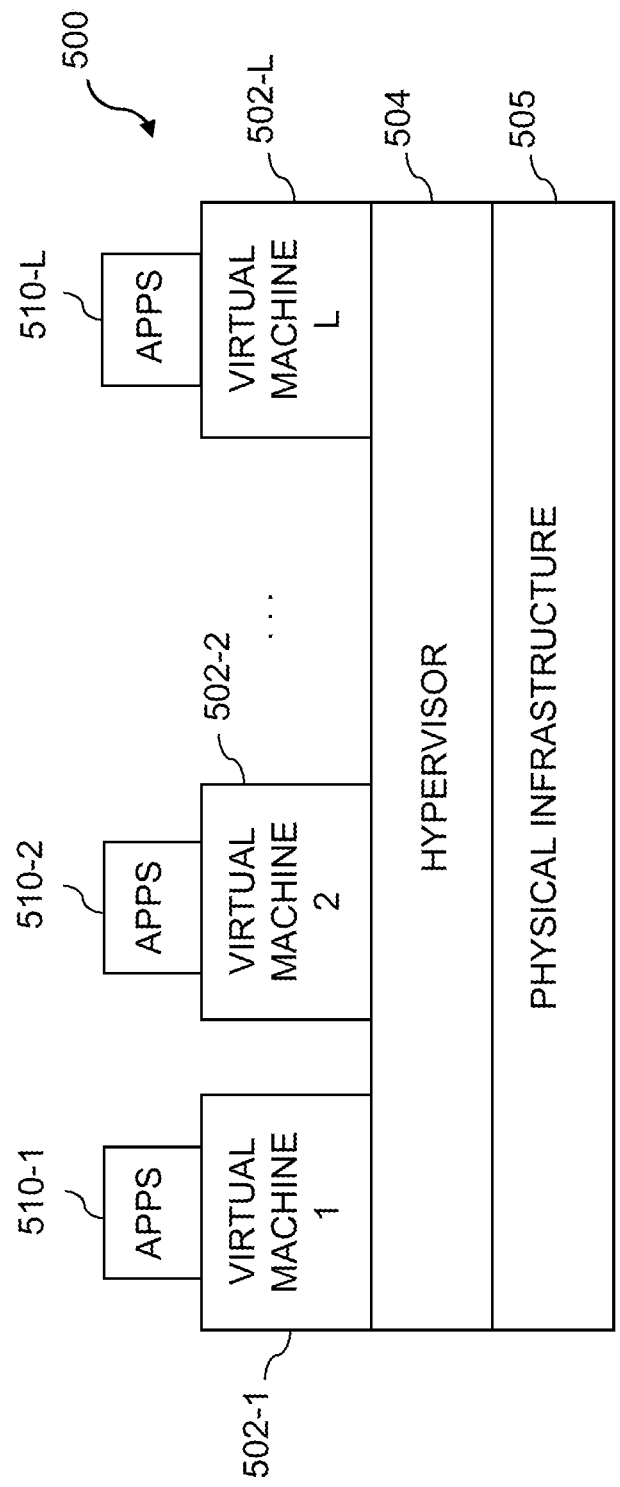

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk, an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 108 and 408 of respective storage systems 105 and 405 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, replication processes, replication engines and associated replication control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage system being configured to implement a loopback replication process in which one or more source storage objects are replicated to one or more corresponding target storage objects within the storage system to test one or more replication functionalities of the storage system;
wherein the storage system is further configured:
to divide a storage space provided by at least portions of the storage devices of the storage system into slices;
to subdivide the slices into source slices and target slices; and
to replicate a source storage object associated with at least one of the source slices to a target storage object associated with at least one of the target slices;
wherein the replication process comprises at least one of a cycle-based asynchronous replication mode and a synchronous replication mode;
wherein the storage system further comprises at least one loopback communication link over which replication-related information is both transmitted and received by the storage system;
wherein the source and the target storage objects comprise respective source and target logical volumes of the storage system;
wherein the storage system is further configured to pair the source storage object with the target storage object by associating the source and the target storage objects with a common pairing identifier;
wherein in conjunction with replication of the source storage object to the target storage object, the storage system is further configured:
to receive the pairing identifier with inbound loopback replication data of the source storage object; and
to utilize the received pairing identifier to identify the target storage object to which the inbound loopback replication data is to be replicated;
wherein logical block addresses of the source and the target storage objects of the storage system are configured to include at least one designated bit indicating for each such logical block address whether that logical block address is in one of the source slices or in one of the target slices;
wherein the pairing identifier comprises a globally-unique identifier randomly generated within the storage system; and
wherein the storage system is implemented using at least one processing device comprising a processor coupled to a memory.

2. The apparatus of claim 1 wherein when in the cycle-based asynchronous replication mode differential data derived from snapshots of the source storage object is utilized to update the target storage object in each of a plurality of replication cycles and when in the synchronous replication mode host write operations directed to the source storage object are mirrored to the target storage object.

3. The apparatus of claim 1 wherein the source storage object is associated with at least one of the source slices by storing the source storage object across portions of the storage devices in designated ones of the source slices.

4. The apparatus of claim 1 wherein the target storage object is associated with at least one of the target slices by storing the target storage object across portions of the storage devices in designated ones of the target slices.

5. The apparatus of claim 1 wherein the storage space is divided into the slices based at least in part on a specified range of bits within logical block addresses of a logical volume of the storage system.

6. The apparatus of claim 1 wherein the storage space has a total storage capacity of X*Y and is divided into X slices each having storage capacity Y and wherein the X slices each having storage capacity Y are further subdivided into X source slices and X target slices such that the storage space effectively includes a total of 2X source and target slices each having storage capacity Y/2.

7. The apparatus of claim 1 wherein the storage system comprises a plurality of storage nodes each comprising one or more of the storage devices and wherein each of the storage nodes of the storage system further comprises a set of processing modules configured to communicate over one or more networks with corresponding sets of processing modules on other ones of the storage nodes, the sets of processing modules of the storage nodes of the storage system collectively comprising at least a portion of the storage controller of the storage system.

8. The apparatus of claim 7 wherein each of the sets of processing modules of the storage system comprises one or more control modules, and wherein different ones of the slices are assigned to different ones of the control modules such that control of the slices within the storage controller of the storage system is evenly distributed over the control modules of the storage controller.

9. A method comprising:
dividing a storage space provided by at least portions of a plurality of storage devices of a storage system into slices;
subdividing the slices into source slices and target slices; and
performing loopback replication of a source storage object associated with at least one of the source slices to a target storage object associated with at least one of the target slices to test one or more replication functionalities of the storage system;
wherein the loopback replication comprises at least one of a cycle-based asynchronous replication mode and a synchronous replication mode;
wherein the storage system further comprises at least one loopback communication link over which replication-related information is both transmitted and received by the storage system;
wherein the source and the target storage objects comprise respective source and target logical volumes of the storage system;
wherein the storage system is further configured to pair the source storage object with the target storage object by associating the source and the target storage objects with a common pairing identifier;
wherein in conjunction with replication of the source storage object to the target storage object, the storage system is further configured:
to receive the pairing identifier with inbound loopback replication data of the source storage object; and
to utilize the received pairing identifier to identify the target storage object to which the inbound loopback replication data is to be replicated;
wherein logical block addresses of the source and the target storage objects of the storage system are configured to include at least one designated bit indicating for each such logical block address whether that logical block address is in one of the source slices or in one of the target slices;
wherein the pairing identifier comprises a globally-unique identifier randomly generated within the storage system; and
wherein the method is implemented by at least one processing device comprising a processor coupled to a memory.

10. The method of claim 9 wherein the source storage object is associated with at least one of the source slices by storing the source storage object across portions of the storage devices in designated ones of the source slices and wherein the target storage object is associated with at least one of the target slices by storing the target storage object across portions of the storage devices in designated ones of the target slices.

11. The method of claim 9 wherein the storage space has a total storage capacity of X*Y and is divided into X slices each having storage capacity Y and wherein the X slices each having storage capacity Y are further subdivided into X source slices and X target slices such that the storage space effectively includes a total of 2X source and target slices each having storage capacity Y/2.

12. The method of claim 9 wherein the storage system comprises a plurality of storage nodes each comprising one or more of the storage devices and wherein each of the storage nodes of the storage system further comprises a set of processing modules configured to communicate over one or more networks with corresponding sets of processing modules on other ones of the storage nodes, the sets of processing modules of the storage nodes of the storage system collectively comprising at least a portion of a storage controller of the storage system.

13. The method of claim 12 wherein each of the sets of processing modules of the storage system comprises one or more control modules, and wherein different ones of the slices are assigned to different ones of the control modules such that control of the slices within the storage controller of the storage system is evenly distributed over the control modules of the storage controller.

14. The method of claim 9 wherein the storage space is divided into the slices based at least in part on a specified range of bits within logical block addresses of a logical volume of the storage system.

15. A computer program product comprising a non-transitory processor-readable storage medium having stored therein program code of one or more software programs, wherein the program code when executed by at least one processing device of a storage system causes the storage system:
to divide a storage space provided by at least portions of a plurality of storage devices of the storage system into slices;
to subdivide the slices into source slices and target slices; and
to perform loopback replication of a source storage object associated with at least one of the source slices to a target storage object associated with at least one of the target slices to test one or more replication functionalities of the storage system;
wherein the replication process comprises at least one of a cycle-based asynchronous replication mode and a synchronous replication mode;
wherein the storage system further comprises at least one loopback communication link over which replication-related information is both transmitted and received by the storage system;
wherein the source and the target storage objects comprise respective source and target logical volumes of the storage system;
wherein the storage system is further configured to pair the source storage object with the target storage object by associating the source and the target storage objects with a common pairing identifier;
wherein in conjunction with replication of the source storage object to the target storage object, the storage system is further configured:
to receive the pairing identifier with inbound loopback replication data of the source storage object; and
to utilize the received pairing identifier to identify the target storage object to which the inbound loopback replication data is to be replicated;
wherein logical block addresses of the source and the target storage objects of the storage system are configured to include at least one designated bit indicating for each such logical block address whether that logical block address is in one of the source slices or in one of the target slices; and
wherein the pairing identifier comprises a globally-unique identifier randomly generated within the storage system.

16. The computer program product of claim 15 wherein the source storage object is associated with at least one of the source slices by storing the source storage object across portions of the storage devices in designated ones of the source slices and wherein the target storage object is associated with at least one of the target slices by storing the target storage object across portions of the storage devices in designated ones of the target slices.

17. The computer program product of claim 15 wherein the storage space has a total storage capacity of X*Y and is divided into X slices each having storage capacity Y and wherein the X slices each having storage capacity Y are further subdivided into X source slices and X target slices such that the storage space effectively includes a total of 2X source and target slices each having storage capacity Y/2.

18. The computer program product of claim 15 wherein the storage system comprises a plurality of storage nodes each comprising one or more of the storage devices and wherein each of the storage nodes of the storage system further comprises a set of processing modules configured to communicate over one or more networks with corresponding sets of processing modules on other ones of the storage nodes, the sets of processing modules of the storage nodes of the storage system collectively comprising at least a portion of a storage controller of the storage system.

19. The computer program product of claim 18 wherein each of the sets of processing modules of the storage system comprises one or more control modules, and wherein different ones of the slices are assigned to different ones of the control modules such that control of the slices within the storage controller of the storage system is evenly distributed over the control modules of the storage controller.

20. The computer program product of claim 15 wherein the storage space is divided into the slices based at least in part on a specified range of bits within logical block addresses of a logical volume of the storage system.

\* \* \* \* \*